United States Patent
Nagai et al.

(10) Patent No.: US 8,587,886 B2
(45) Date of Patent: Nov. 19, 2013

(54) LENS DRIVE DEVICE, LENS MODULE, AND IMAGE PICKUP DEVICE

(75) Inventors: Nobuyuki Nagai, Kanagawa (JP); Takehisa Ishida, Tokyo (JP); Yusaku Kato, Tokyo (JP); Yoshiteru Kamatani, Kanagawa (JP)

(73) Assignee: Sony Corporation, Tokyo (JP)

( * ) Notice: Subject to any disclaimer, the term of this patent is extended or adjusted under 35 U.S.C. 154(b) by 64 days.

(21) Appl. No.: 13/318,466

(22) PCT Filed: Dec. 3, 2010

(86) PCT No.: PCT/JP2010/071700
§ 371 (c)(1),
(2), (4) Date: Nov. 1, 2011

(87) PCT Pub. No.: WO2011/121851
PCT Pub. Date: Oct. 6, 2011

(65) Prior Publication Data
US 2012/0050898 A1    Mar. 1, 2012

(30) Foreign Application Priority Data

Mar. 29, 2010 (JP) ................................. 2010-075635
Apr. 7, 2010 (JP) ................................. 2010-088761

(51) Int. Cl.
*G02B 7/02* (2006.01)
*G02B 7/08* (2006.01)

(52) U.S. Cl.
CPC ....................................... *G02B 7/08* (2013.01)
USPC ............................................ 359/824; 359/814

(58) Field of Classification Search
USPC .................................. 359/813–814, 823–824
See application file for complete search history.

(56) References Cited

U.S. PATENT DOCUMENTS

| | | | |
|---|---|---|---|
| 6,801,493 B2 * | 10/2004 | Jang et al. ..................... | 369/221 |
| 7,619,837 B2 * | 11/2009 | Choi et al. .................... | 359/811 |
| 2009/0046194 A1 * | 2/2009 | Sladen .......................... | 348/335 |
| 2009/0147340 A1 | 6/2009 | Lipton et al. | |

FOREIGN PATENT DOCUMENTS

| | | |
|---|---|---|
| JP | 2006-172635 | 6/2006 |
| JP | 2006-293006 | 10/2006 |
| JP | 2009-42408 | 2/2009 |
| JP | 2009-300552 | 12/2009 |

* cited by examiner

*Primary Examiner* — Scott J Sugarman
*Assistant Examiner* — Robert E Tallman
(74) *Attorney, Agent, or Firm* — K&L Gates LLP

(57) ABSTRACT

Provided are a lens drive device capable of moving with good accuracy a lens in the direction of an optical axis thereof, and a lens module and an image pickup device provided with such a lens drive device. By a pair of polymer actuator elements 441 and 442, a lens holding member 43 is driven via coupling members 451A, 451B, 452A, and 452B. As a result, a lens 48 can be moved with good accuracy in the direction of the optical axis Z1 thereof. In addition, preferably, the coupling members 451A, 451B, 452A, and 452B have the rigidity same as or lower than that of each of the polymer actuator elements 441 and 442.

10 Claims, 10 Drawing Sheets

LENS DRIVE DEVICE, LENS MODULE, AND IMAGE PICKUP DEVICE

CROSS REFERENCE TO RELATED APPLICATIONS

The present application is a national stage of International Application No. PCT/JP2010/071700 filed on Dec. 3, 2010 and claims priority to Japanese Patent Application No. 2010-075635 filed on Mar. 29, 2010, and Japanese Patent Application No. 2010-088761 filed on Apr. 7, 2010, the disclosures of which are incorporated herein by reference.

BACKGROUND

The present invention relates to a lens drive device including a polymer actuator element, and a lens module and an image pickup device provided with such a lens drive device.

In recent years, portable electronic devices such as mobile phones, personal computers (PCs), or PDAs (Personal Digital Assistants) have been remarkably improved in performance, and those having an imaging function with the provision of a lens module are now popular. In such portable electronic devices, focusing and zooming are performed by moving a lens in the lens module in the direction of an optical axis thereof.

Previously, for moving the lens in the lens module, generally used is a method therefor using a voice coil motor or a stepping motor as a drive section. However, in terms of size reduction, recently developed is the one using a polymer actuator element as a drive section (for example, see Patent Literatures 1 and 2). The polymer actuator element is the one including an ion-exchange resin film sandwiched between a pair of electrodes, for example. In this polymer actuator element, due to a potential difference between the pair of electrodes, the ion-exchange resin film is displaced in the direction orthogonal to the film surface.

CITATION LIST

Patent Literature

Patent Literature 1: Japanese Unexamined Patent Application Publication No. 2006-293006
Patent Literature 2: Japanese Unexamined Patent Application Publication No. 2006-172635

SUMMARY

Herein, with a lens module in Patent Literature 1 in the above, a polymer actuator element is used to drive a lens that is configured to move by a guide, a guide pin (guide section), or others along the optical axis (parallel to the optical axis). With this technique, however, the moving operation of the lens is not performed consistently because the torque (driving force) of the polymer actuator element is not sufficiently large in value with respect to the friction of the guide section. To be specific, the lens is hardly moved until the driving force takes a certain value (threshold value), but at the instant when the value is exceeded, is abruptly moved and also thereafter, is moved unstably (nonlinearly) in response to any increase of the driving force.

In consideration thereof, proposed is a technique of disposing a pair of flat-plate polymer actuator elements to oppose each other in the direction of the optical axis of a lens (parallel flat plate mode). This technique, however, has a difficulty in moving the lens along the optical axis thereof while keeping it in the parallel state. That is, the lens may not operate parallel with respect to the optical axis.

On the other hand, with a lens module in Patent Literature 2 in the above, the lens is moved in the direction of the optical axis thereof through combination of a set of polymer actuator elements of different bending directions. Also with this technique, however, when the inconsistency of operation (variations in amount of deformation) resulted from variations in characteristics or others is observed between such a set of polymer actuator elements, this causes a difficulty in moving the lens in the direction of the optical axis thereof. That is, there may be cases where the lens does not move parallel with respect to the optical axis, or the lens is tilted with respect to the optical axis.

As such, with the previous lens drive device using the polymer actuator element, moving the lens with good accuracy in the direction of the optical axis thereof has been difficult; and there thus has been a demand for a technique for improvement.

The invention is proposed in consideration of such problems, and an object thereof is to provide a lens drive device in which a lens can be moved with good accuracy in the direction of the optical axis thereof, and a lens module and an image pickup device provided with such a lens drive device.

A lens drive device of the invention includes a lens holding member holding a lens, a plurality of polymer actuator elements each having a drive surface orthogonal to an optical axis of the lens, and being disposed in such a manner that the drive surfaces are opposed to each other along the optical axis of the lens, a fixing member fixing directly or indirectly an end of each of the plurality of polymer actuator elements, and a coupling member coupling the other end of each of the plurality of polymer actuator elements and an end portion of the lens holding member.

A lens module of the invention includes a lens, and the lens drive device of the invention described above.

An image pickup device of the invention is the one including a lens, an image pickup element acquiring an image pickup signal as a result of image formation by this lens, and the lens drive device of the invention described above.

With the lens drive device, the lens module, and the image pickup device of the invention, by the lens holding member being driven by a plurality of polymer actuator elements, the lens becomes able to move along the direction of the optical axis thereof. At this time, by the lens holding member being driven via the coupling member, the lens is driven with more ease in the direction of the optical axis thereof while keeping the parallel state.

With the lens drive device, the lens module, and the image pickup device of the invention, the coupling member described above preferably has the rigidity same as or lower than that of each of the polymer actuator elements. If this is the configuration, this accordingly generates the flexibility for the coupling member to bend in the direction opposite to, the bending direction of each of the polymer actuator elements. Therefore, the cross-sectional shape of the cantilever configured by the polymer actuators and the coupling member is to render the S-shaped curve. As a result, the lens will be moved with much more ease in the direction of the optical axis thereof while remaining in the parallel state.

According to the lens drive device, the lens module, and the image pickup device of the invention, by a plurality of polymer actuator elements, the lens holding member is driven via the coupling member so that the lens can be moved with good accuracy in the direction of the optical axis thereof.

Additional features and advantages of the present invention are described in, and will be apparent from, the following Detailed Description and the Figures.

DETAILED DESCRIPTION

In the below, an embodiment of the invention will be described in detail by referring to the accompanying drawings. Herein, the description will be given in the following order.

1. Embodiment (exemplary lens drive device or others provided with a coupling member for coupling between a pair of polymer actuator elements, and a lens holding member)
2. Modified Examples
<Embodiment>
[Schematic Configuration of Electronic Device Provided with Image Pickup Device]

Figure 1:
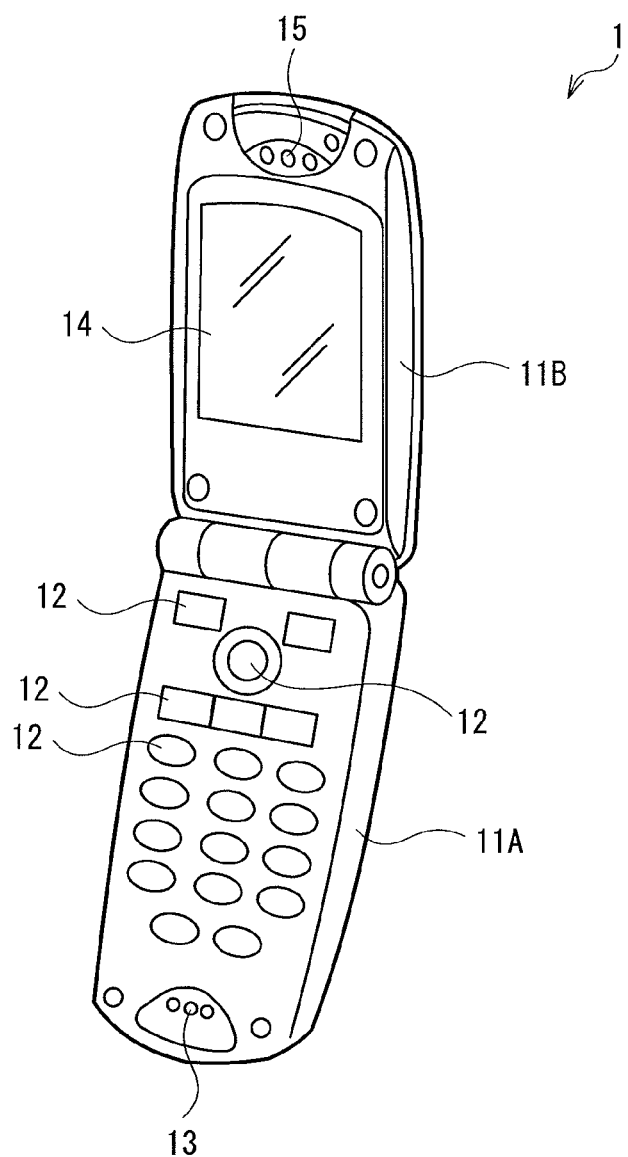
FIG. 1 A perspective diagram showing an exemplary configuration of an electronic device provided with an image pickup device according to an embodiment of the invention.
Figure 2:
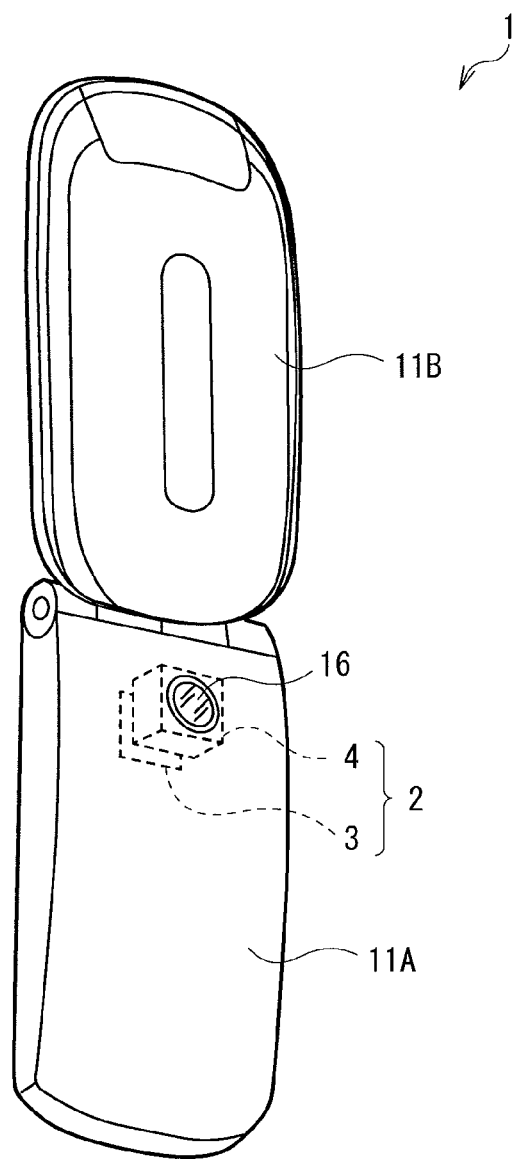
FIG. 2 A perspective view of the electronic device shown in FIG. 1 from a different direction.

FIGS. 1 and 2 are each a perspective diagram showing the schematic configuration of an imaging-function-provided mobile, phone (a mobile phone 1) as an example of electronic device provided with an image pickup device (an image pickup device 2 that will be described later) according to an embodiment of the invention. In this mobile phone 1, two chassis 11A and 11B are coupled to each other to be freely folded via a hinge mechanism that is not shown.

As shown in FIG. 1, on the surface of the chassis 11A on one side, a plurality of various operation keys 12 are disposed, and at the lower end portion thereof, a microphone 13 is disposed. The operation keys 12 are for input of information in response to a predetermined operation by a user. The microphone 13 is for input of the user's voice during a telephone conversation, for example.

On the surface of the chassis 11B on one side, as shown in FIG. 1, a display section 14 using a liquid crystal display panel or others is disposed, and at the upper end portion thereof, a speaker 15 is disposed. The display section 14 is so configured as to display various types of information such as the reception status of radio waves, the remaining amount of battery, the telephone number of a person on the other end of the phone, the details listed as a telephone directory (the telephone number of the person on the other end of the phone, his or her name, and others), the outgoing call history, and the incoming call history, for example. The speaker 15 is for output of voice or others of a person on the other end of the phone during a telephone conversion, for example.

As shown in FIG. 2, on the surface of the chassis 11A on the other side, a cover glass 16 is disposed, and at the position corresponding to the cover glass 16 inside of the chassis 11A, the image pickup device 2 is disposed. This image pickup device is configured by a lens module 4 disposed on the object side (on the side of the cover glass 16), and an image pickup element 3 disposed on the image side (on the inner side of the chassis 11A). The image pickup element 3 is an element that acquires an image pickup signal as a result of image formation by a lens (a lens 48 that will be described later) inside of the lens module 4. This image pickup element 3 is configured by an image sensor incorporating a charge coupled device (CCD) or a CMOS (Complementary Metal Oxide Semiconductor), for example.

[Configuration of Image Pickup Device 2]

Figure 3:
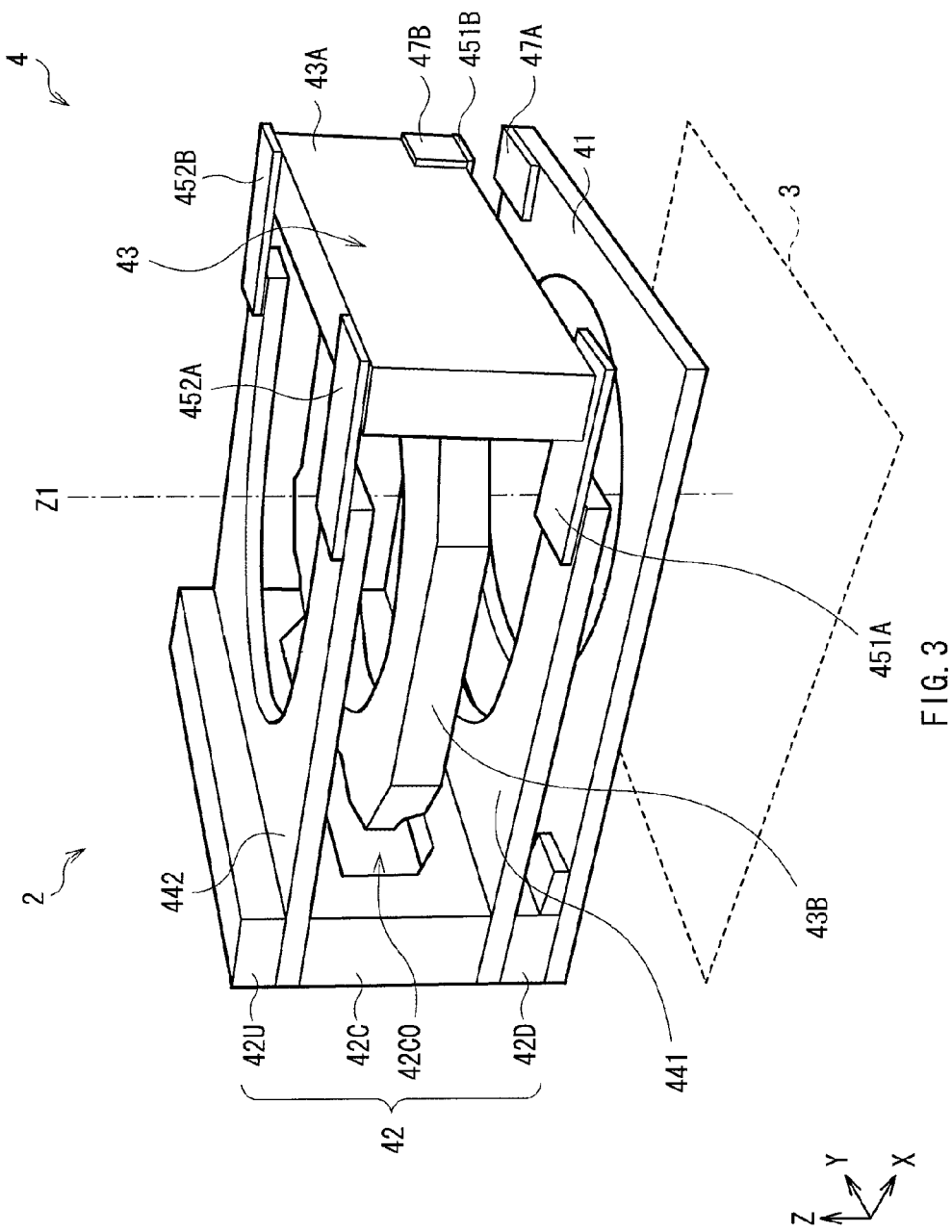
FIG. 3 A perspective diagram showing an exemplary configuration of a main part of the image pickup device shown in FIG. 2.
Figure 4:
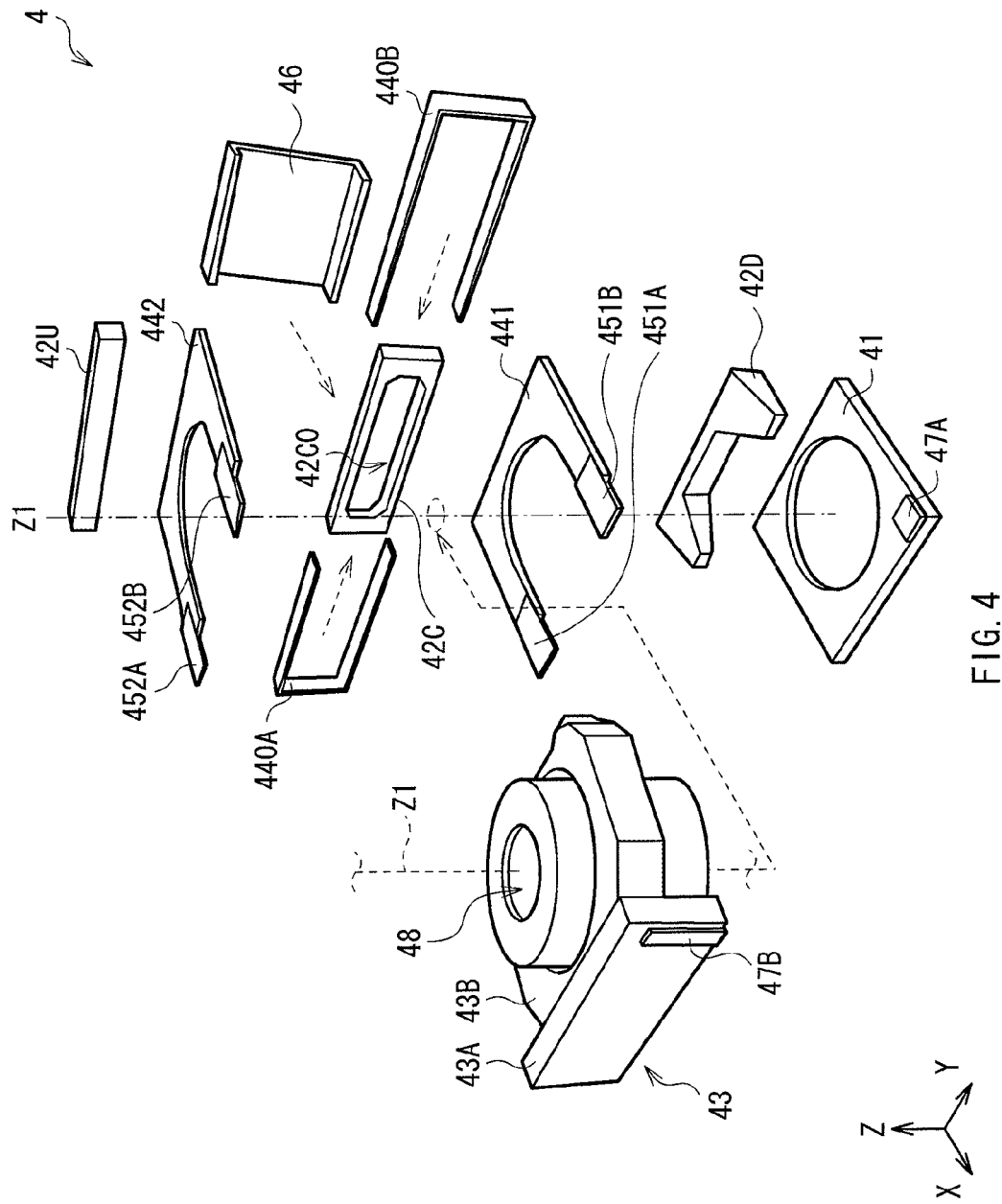
FIG. 4 An exploded perspective view of a lens module shown in FIG. 3.

FIG. 3 is a perspective view showing the configuration of a main part of the image pickup device 2, and FIG. 4 is an exploded perspective view showing the configuration of the lens module 4 in this image pickup device 2. The lens module 4 is provided with, in order from the image side (the side of the image pickup element 3) to the object side along an optical axis Z1 (along the forward direction on the Z axis), a support member 41, a polymer actuator element 441, a lens holding member 43, the lens 48, and a polymer actuator element 442. Note that, in FIG. 3, the lens 48 is not shown. This lens module 4 is also provided with a fixing member 42, coupling members 451A, 451B, 452A, and 452B, fixed electrodes 440A and 440B, a holding member 46, and Hall elements 47A and 47B. Herein, the one including these components of the lens module 4 but excluding the lens 48 corresponds to a specific example of the "lens drive device" of the invention.

The support member 41 is a base member (substrate) for supporting the lens module 4 in its entirety, and is made of a hard resin material such as liquid crystal polymer, for example.

The fixing member 42 is a member for directly fixing one end of the polymer actuator element 441 and that of the polymer actuator element 442, and is made of a hard resin material such as liquid crystal polymer, for example. This fixing member 42 is configured by three members of a lower-portion fixing member 42D, a center (middle-portion) fixing member 42C, and an upper-portion fixing member 42U, which are disposed from the image side (the lower side in FIGS. 3 and 4) toward the object side (the upper side). Between the lower-portion fixing member 42D and the center fixing member 42C, an end of the polymer actuator element 441, and an end of the fixing electrode 440A and that of the fixing electrode 440B are sandwiched and positioned. On the other hand, between the center fixing member 42C and the upper-portion fixing electrode 42U, an end of the polymer actuator element 442, and the other end of the fixing electrode 440A and that of the fixing electrode 440B are sandwiched and positioned. Moreover, to the center fixing member 42C among these, an aperture 42C0 is formed for partially sandwiching a part of the lens holding member 43 (a part of a holding section 43B that will be described later). Thereby, the part of the lens holding member 43 becomes able to move inside of this aperture 43C0, and thus the space can be utilized with good efficiency so that an attempt can be made to reduce the size of the lens module 4.

Figure 5:
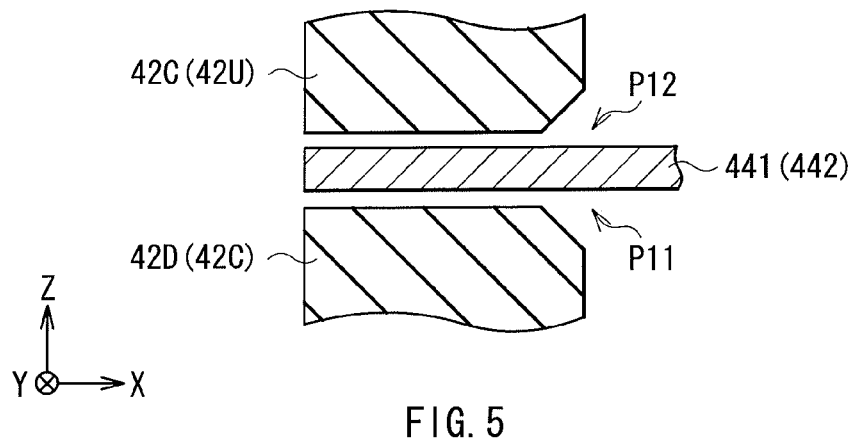
FIG. 5 A schematic cross-sectional diagram showing an exemplary detailed partial configuration of a fixing member and that of a polymer actuator element.

Note that, the lower-portion fixing member 42D, the center fixing member 42C, and the upper-portion fixing member 42U as such preferably have such a cross-sectional shape as schematically shown by the cross-sectional diagram of FIG. 5 (the Z-X cross-sectional diagram), for example. That is, the polymer actuator elements 441 and 442 are preferably chamfered at the corner portions (edge portions) on the side of deforming (bending) (side of moving ends) as will be described later. As a result, the polymer actuator elements 441 and 442 become able to move with more ease when bending, and the scraping and wearing by the corner portions thereof can be reduced so that the polymer actuator elements 441 and 442 are increased in durability.

The fixed electrodes 440A and 440B are electrodes for making a supply of voltage to electrode films (electrode films 52A and 52B) of the polymer actuator elements 441 and 442 that will be described later from voltage application means (voltage application means 6 that will be described later) that is not shown. These fixed electrodes 440A and 440B are each made of gold (Au) or gold-plated metal, for example, and are each in the U-shape. As such, the fixed electrodes 440A and 440B each sandwich the upper and lower portions (both side surfaces along the Z-axis direction) of the center fixing member 42C, thereby being able to apply the same level of voltage in parallel to a pair of polymer actuator elements 441 and 442 with less wiring. Moreover, when the fixed electrodes 440A and 440B are each made of a gold-plated metal material, the contact resistance can be prevented from being degraded by the surface oxidation, for example.

The lens holding member 43 is a member holding the lens 48, and is made of a hard resin material such as liquid crystal polymer, for example. This lens holding member 43 is so disposed that the center thereof comes on the optical axis Z1, and is configured to include the ring-shaped holding section 43B that retains the lens 48, and a connection section 43A. The connection section 43A supports the holding section 43B, and connects the holding section 43B with the coupling members 451A, 451B, 452A, and 452B that will be described later. Moreover, the holding section 43B is disposed between drive surfaces of a pair of polymer actuator elements 441 and 442 that will be described later.

(Polymer Actuator Elements 441 and 442)

The polymer actuator elements 441 and 442 each have the drive surface (the drive surface on the X-Y plane) orthogonal to the optical axis Z1 of the lens 48, and are so disposed that their drive surfaces are opposed to each other along this optical axis. Z1. The polymer actuator elements 441 and 442 are each for driving the lens holding member 43 (and the lens 48) along the optical axis Z1 via the coupling members 451A, 451B, 452A, and 452B that will be described later.

Figure 6:
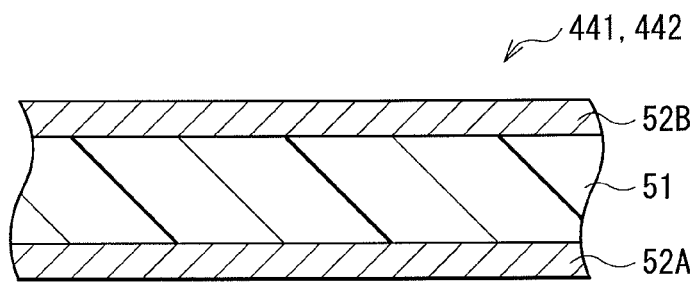
FIG. 6 A cross-sectional diagram showing an exemplary detailed configuration of the polymer actuator element.

As shown in FIG. 6, these polymer actuator elements 441 and 442 each have the cross-sectional configuration in which both surfaces of an ion conductive polymer compound film 51 (hereinafter, simply referred to as polymer compound film 51) are respectively attached with a pair of electrode films 52A and 52B. In other words, the polymer actuator elements 441 and 442 each has a pair of electrode films 52A and 52B, and the polymer compound film 51 disposed by insertion between these electrode films 52A and 52B. Note here that the polymer actuator elements 441 and 442, and the electrode films 52A and 52B may be covered therearound with an insulation protection film made of a material with a high elasticity (e.g., polyurethane).

Figure 7:
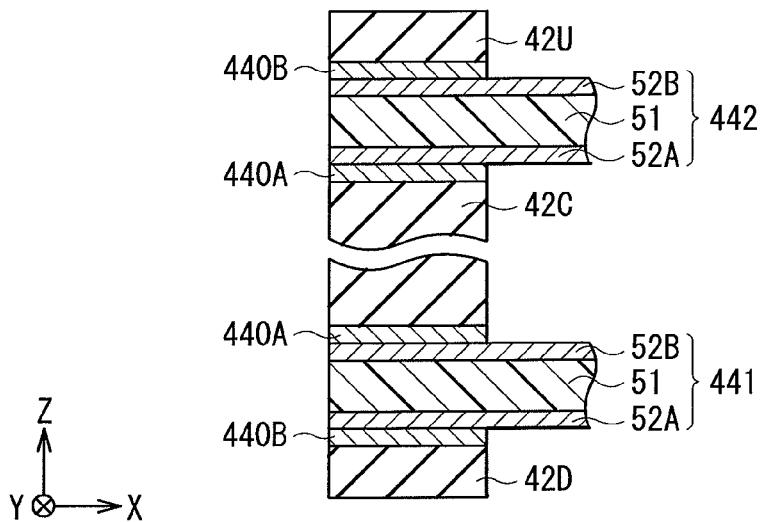
FIG. 7 A cross-sectional diagram showing a detailed partial configuration of the polymer actuator element, a fixing member, and a fixed electrode.

Herein, as shown by the cross-sectional diagram (the Z-X cross-sectional diagram) of FIG. 7, in the polymer actuator element 441, the electrode film 52A is electrically connected to the fixed electrode 440B on the lower-portion fixing member 42D side, and the electrode film 52B is electrically connected to the fixed electrode 440AB on the center fixing member 42C side. On the other hand, in the polymer actuator element 442, the electrode film 52A is electrically connected to the fixed electrode 440A on the center fixing member 42C side, and the electrode film 52B is electrically connected to the fixed electrode 440B on the upper-portion fixing member 42U side. Note that, although not shown in FIG. 7, the members/electrodes from the fixed electrode 440B on the lower-portion fixing member 42D side to the fixed electrode 440B on the upper-portion fixing member 42U side are each so fixed as to be sandwiched by the holding member 46 (leaf spring) shown in FIG. 4 with a certain pressure. As a result, the polymer actuator elements 441 and 442 are not damaged even with a large force, and any stable electric connection can be established after these polymer actuator elements 441 and 442 are deformed.

The polymer compound film 51 is to be bent when the electrode films 52A and 52B have a predetermined potential difference therebetween. This polymer compound film 51 is impregnated with an ionic substance. The "ionic substance" herein refers to ion in general that allows conduction in the polymer compound film 51, and specifically, means a single hydrogen ion, a single metal ion, or the one including cations and/or anions as such and a polar solvent, or the one including cations and/or anions each being in the form of a liquid such as imidazolium salt. The former is exemplified by the one as a result of salvation of a polar solvent with cations and/or anions, for example, and the latter is exemplified by an ionic liquid, for example.

The material composing the polymer compound film 51 is exemplified by a fluorine resin or an ion-exchange resin with the hydrocarbon skeleton, for example. As the ion-exchange resin as such, a cation-exchange resin is preferable when a cationic substance is impregnated, and when an anionic substance is impregnated, an anion-exchange resin is preferable.

As the cation-exchange resin, exemplified is the one in which an acidic group such as sulfonic acid group or carboxyl group is introduced. To be specific, exemplified are polyethylene with an acidic group, polystyrene with an acidic group, a fluorine resin with an acidic group, or others. Among all, as the cation-exchange resin, a fluorine resin with a sulfonic acid group or a carboxylic acid group is preferable, and exemplified is Nafion (manufactured by Du Pont Kabushiki Kaisha).

The cationic substance impregnated in the polymer compound film 51 is not restrictive by type such as organic or inorganic. For example, various types of forms are applicable, including a single metal ion, the one including metal ions and water, the one including organic cations and water, or an ionic liquid. The metal ions are exemplified by light-metal ions including sodium ions ($Na^+$), potassium ions ($K^+$), lithium ions ($Li^+$), magnesium ions ($Mg^+$), or others. Moreover, as the organic cations, exemplified are alkylammonium ions, or others. Such cations exist as a hydrate in the polymer compound film 51. Accordingly, when a cationic substance including cations and water is impregnated in the polymer compound film 51, the polymer actuator elements 441 and 442 are preferably sealed in their entirety for prevention of volatilization of water.

The ionic liquid is the one also referred to as ambient temperature molten salt, and includes cations and anions with low flammability and volatility. The ionic liquid includes, for example, an imidazolium cyclic compound, a pyridinium cyclic compound, or an aliphatic compound.

In particular, the cationic substance is preferably an ionic liquid. Because of the low volatilization thereof, the polymer actuator elements 441 and 442 operate satisfactorily even in a high temperature atmosphere or in a vacuum.

The electrode films 52A and 52B opposing each other with the polymer compound film 51 therebetween each include one or two or more conductive materials. The electrode films 52A and 52B are preferably those in which conductive material powder is bound together by ion conductive polymers. This is because the electrode films 52A and 52B are increased in flexibility. As the conductive material powder, carbon powder is preferable. This is because the resulting amount of deformation can be larger with the high conductivity and the large specific surface thereof. As the carbon powder, Ketjen Black is preferable. As the ion conductive polymers, the one similar to the composing material of the polymer compound film 51 described above is preferable.

The electrode films 52A and 52B are formed as below, for example. A coating material in which conductive material powder and conductive polymers are dispersed in a disperse medium is applied on both surfaces of the polymer compound film 51, and then is dried. Alternatively, the one in the shape of film including the conductive material powder and the ion conductive polymers may be pressure-bonded to both surfaces of the polymer compound film 51.

The electrode films 52A and 52B may be in the multilayer structure, and if this is the case, may be preferably in the laminate structure of including, in order from the polymer compound film 51 side, a layer in which the conductive material powder is bonded together by the ion conductive polymers and a metal layer. This is because, thereby, the potential takes a more uniform value in the in-plane direction of the electrode films 52A and 52B, and the resulting deformation capabilities can be more outstanding. As a material configuring the metal layer, exemplified is noble metal such as gold, platinum, and others. The thickness of the metal layer is arbitrary, but being a continuous film is preferable to achieve a uniform potential to the electrode films 52A and 52B. As a method for forming such a metal layer, exemplified is plating, vapor deposition, sputtering, and others.

The size (width and length) of the polymer compound film 51 can be arbitrarily set in accordance with the size or weight of the lens holding member 43, or the needed amount of displacement of the polymer compound film 51, for example. The amount of displacement of the polymer compound film 51 is set in accordance with the requested amount of movement along the optical axis Z1 of the lens holding member 43.

Figure 8:
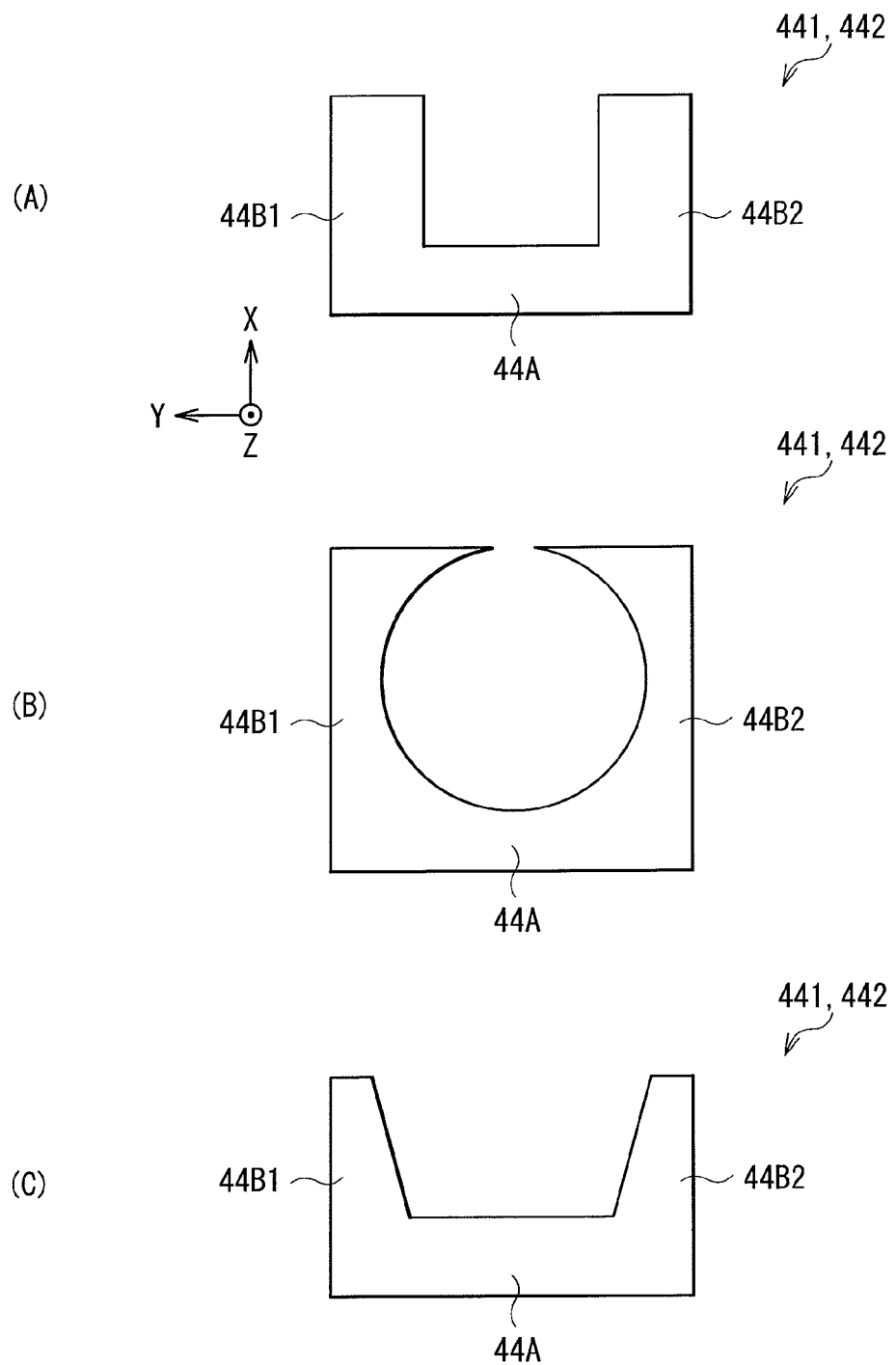
FIG. 8 Schematic diagrams showing another exemplary shapes of the polymer actuator element in a planar view.

In addition, preferably, the polymer actuator elements 441 and 442 each have such a planar shape (X-Y planar shape) as schematically shown in FIGS. 8(A) to (C), for example. That is, preferably, the polymer actuator elements 441 and 442 are each configured by a fixing section 44A being a portion fixed to the fixing member 42, and a pair of protrusion sections 44B1 and 44B2. The protrusion sections 44B1 and 44B2 are respectively provided at both ends of the fixing section 44A (at both ends along the Y-axis direction in this example), and configure the drive surface. To be specific, as shown in FIG. 8(A), for example, preferably, the polymer actuator elements 441 and 442 are each in the shape of a "U-shape" in a planar view. This is because, thereby, in the polymer actuator elements 441 and 442, the variation of parallelism in the drive surface is reduced or avoided. Alternatively, as shown in FIG. 8(B), for example, an aperture (a circular aperture in this example) corresponding to the shape of the lens holding member 43 may be provided. As a result, the clearance between the lens 48 and the lens holding member 43 can be used with good efficiency, and the torque (driving force) and the amount of displacement by the polymer actuator elements 441 and 442 can be increased at a maximum. Moreover, as shown in FIG. 8(C), for example, the protrusion sections 44B1 and 44B2 may be gradually reduced in width from the fixing section 44A side toward the tip end side. In other words, the base-side width of each of the protrusion sections 44B1 and 44B2 may be about the same as or wider than the tip-end-side width. As a result, the resonance frequency of the polymer actuator elements 441 and 442 can be set high, thereby being able to increase the frequency range available for automatic control, and the space at the corner can be used with good efficiency. At this time, because the magnitude of the driving force by the polymer actuator elements 441 and 442 is determined mainly by the base-side width, even if the tip-end-side width is reduced, the driving force is hardly sacrificed.

(Coupling Members 451A, 451B, 452A, and 452B)

The coupling members 451A, 451B, 452A, and 452B shown in FIGS. 3 and 4 are each a member for coupling (connecting) the other end of each of the polymer actuator elements 441 and 442 with the end portions of the connection section 43A of the lens holding member 43. To be specific, the coupling members 451A, 451B, 452A, and 452B in this example each serve to establish a coupling between the four corners of the connection section 43A and two pairs of protrusion sections 44B1 and 44B2 in the polymer actuator elements 441 and 442. These coupling members 451A, 451B, 452A, and 452B are each made of a flexible film such as polyimide film, for example, and preferably, are each made of a flexible material with the rigidity about the same as or lower than that of each of the polymer actuator elements 441 and 442. This is because, thereby, although the details will be described later, the holding section 43B (and the lens 48) will be driven with more ease in the Z-axis direction while remaining in the parallel state with respect to the support member 41 (the lens 48 will be moved with much more ease along the optical axis Z1 thereof). In addition, the coupling members 451A, 451B, 452A, and 452B preferably have the heat resistance up to the temperature of about 200° C. or higher, for example. This is because, thereby, the characteristics are prevented from changing even with a high-temperature process such as reflow processing, for example.

Herein, as the rigidity described above, a spring constant can be used, for example. This spring constant is expressed by the following equations (1) and (2). Note that, in these equations, E denotes Young's modulus ($kg/cm^2$), I denotes the second moment of area ($=bh^3/12$) ($cm^4$)), b denotes the width (cm), h denotes the thickness (cm), and L denotes the length (cm), respectively. As a specific example, for example, in the polymer actuator elements 441 and 442, the spring constant K when the length L=5 mm, the width b=1 mm, and the thickness h=0.1 mm will be $3\times5\times10^3\times0.1\times(0.01)^3/12/(0.5)^3=1\times10^{-3}$ by the following equation (1). Moreover, in this case, in the coupling members 451A, 451B, 452A, and 452B each made of a Kapton film with the length L=1 mm and the width b=1 mm, the thickness h to have the spring constant K of about the same as that of the polymer actuator elements 441 and 442 is calculated as below using the equation (I). That is, it will be (the thickness h of the polymer actuator elements 441 and 442)/(Young's modulus E of the Kapton film/ Young's modulus E of the polymer actuator elements 441 and 442)/(the length L of the polymer actuator elements 441 and 442/the length L of the Kapton film)$^3$=0.1×(5×10$^3$)/(3×10$^4$)/ 5$^3$=0.013. Note that, practically, the polymer actuator elements 441 and 442 may have the thickness h of about 110 to 120 μm, and the Kapton film may have the thickness h of about 15 p.m. As such, the spring constant K as exemplary rigidity of the coupling members 451A, 451B, 452A, and 452B is preferably about 1×10$^3$, for example.

$$\text{Spring Constant } K=(3EI/L^3) \qquad (1)$$

$$\text{Flexural Rigidity}=EI(\text{kg·cm}^2) \qquad (2)$$

Figure 9:
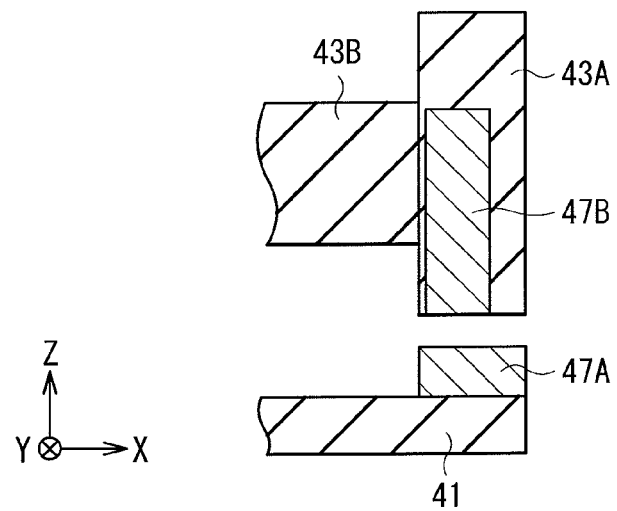
FIG. 9 A schematic cross-sectional diagram showing another exemplary placement configuration of a Hall element.

The Hall elements 47A and 47B shown in FIGS. 3 and 4 are each an element for use to detect the amount of movement of the lens holding member 43, and are each exemplified by a combination of a Hall element and a magnet. To be specific, as shown in FIG. 9, for example, when these Hall elements are a combination of the Hall element 47A and the magnet 47B, the magnet 47B may be provided inside the connection section 43A. In this case, there is no need for such a space as shown in FIGS. 3 and 4 for provision of the magnet 47B so that an attempt can be made to reduce the size and to increase the sensitivity.

[Action and Effects of Image Pickup Device 2]

Next, described are the action and effects of the image pickup device 2 in this embodiment.

(1. Operation of Polymer Actuator Elements 441 and 442)

Figure 10:
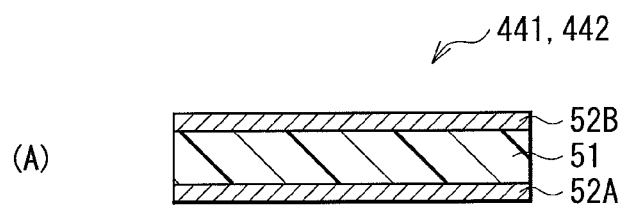
FIG. 10 Schematic cross-sectional diagrams for explaining the basic operation, of the polymer actuator element.
Figure 10:
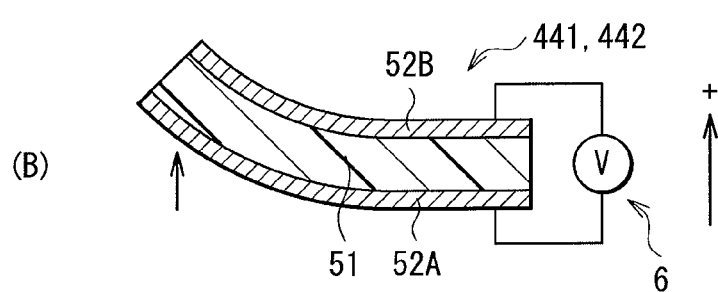
Figure 11:
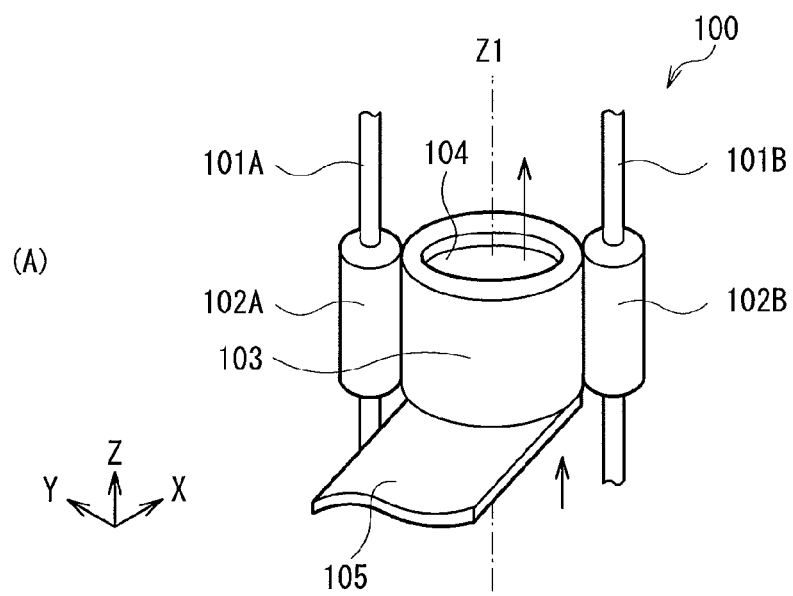
FIG. 11 A schematic diagram for explaining the configuration and operation of a lens module according to a comparison example 1.
Figure 11:
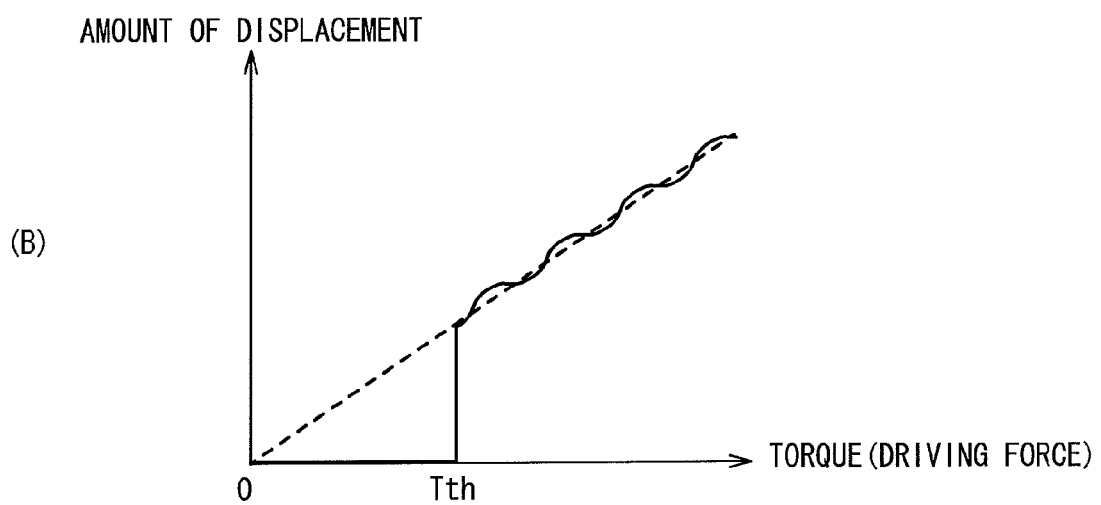

First of all, by referring to FIG. 10, described is the operation of the polymer actuators 441 and 442. FIG. 10 is a diagram schematically showing the operation of the polymer actuator elements 441 and 442 using the cross-sectional view thereof.

First of all, described is a case of using, as a cationic substance, the one including cations and a polar solvent.

In this case, the polymer actuator elements 441 and 442 in the state of no voltage application are not bent but are flat because the cationic substance is dispersed almost uniformly in the polymer compound film 51 (FIG. 10(A)). Herein, when the state is changed to voltage application using the voltage application means 6, the polymer actuator elements 441 and 442 behave as below. That is, when a predetermined level of drive voltage is applied between the electrode films 52A and 52B in such a manner that the electrode film 52A is at a negative potential and the electrode film 52B is at a positive potential, the cations are moved to the electrode film 52A side in the state of salvation with the polar solvent. At this time, because the anions can hardly move in the polymer compound film 51, in the polymer compound film 51, the electrode film 52A side is swollen, and the electrode film 52B side is shrunk. As a result, the polymer actuator elements 441 and 442 are bent in their entirety to the electrode film 52B side as shown in FIG. 10(B). Thereafter, when the state is changed to no voltage application by eliminating the potential difference between the electrode films 52A and 52B, the cationic substance (the cations and the polar solvent) unevenly dispersed to the electrode film 52A side in the polymer compound film 51 starts dispersing, and is put back in the state shown in FIG. 10(A). Moreover, from the state of no voltage application shown in FIG. 10(A), when a predetermined level of drive voltage is applied between the electrode films 52A and 52B in such a manner that the electrode film 52A is at a positive potential and the electrode film 52B is at a negative potential, the cations are moved to the electrode film 52B side in the state of salvation with the polar solvent. In this case, in the polymer compound film 51, because the electrode film 52A side is shrunk, and the electrode film 52B side is swollen, the polymer actuator elements 441 and 442 are bent in their entirety to the electrode film 52A side.

Next, described is a case of using, as a cationic substance, an ionic liquid including cations in the form of liquid.

Similarly in this case, in the state of no voltage application, because the ionic liquid is dispersed almost uniformly in the polymer compound film 51, the polymer actuator elements 441 and 442 become flat in a planar view as shown in FIG. 10(A). Herein, when the state is changed to voltage application using the voltage application means 6, the polymer actuator elements 441 and 442 behave as below. That is, when a predetermined level of drive voltage is applied between the electrode films 52A and 52B in such a manner that the electrode film 52A is at a negative potential and the electrode film 52B is at a positive potential, the cations in the ionic liquid are moved to the electrode film 52A side but the anions are not able to move in the polymer compound film 51 being a cation-exchange film. Therefore, in the polymer compound film 51, the electrode film 52A side thereof is swollen, and the electrode film 52B side thereof is shrunk. As a result, the polymer actuator elements 441 and 442 are bent in their entirety to the electrode film 52B side as shown in FIG. 10(B). Thereafter, when the state is changed to no voltage application by eliminating the potential difference between the electrode films 52A and 52B, the cations unevenly dispersed to the electrode film 52A side in the polymer compound film 51 start dispersing, and are put back in the state shown in FIG. 10(A). Moreover, from the state of no voltage application shown in FIG. 10(A), when a predetermined level of drive voltage is applied between the electrode films 52A and 52B in such a manner that the electrode film 52A is at a positive potential and the electrode film 52B is at a negative potential, the cations in the ionic liquid are moved to the electrode film 52B side. In this case, in the polymer compound film 51, because the electrode film 52A side is shrunk, and the electrode film 52B side is swollen, the polymer actuator elements 441 and 442 are, bent in their entirety to the electrode film 52A side.

In addition, in this case, preferably, the electrode films 52A and 52B are not applied with the voltage equal to or higher than the withstand voltage of the polymer actuator elements 441 and 442 (e.g., about 3V) for a long time (e.g., about a second). This is because, thereby, the polymer actuator elements 441 and 442 can be increased in durability.

(2. Operation of Image Pickup Device 2)

Next, by referring to FIGS. 11 to 14, the operation of the image pickup device 2 in its entirety will be described in detail in comparison with comparison examples (comparison examples 1 to 3). Herein, FIGS. 11 to 13 each show the configuration and operation of lens modules (lens modules 100 to 300) in image pickup devices in the comparison example 1 to the comparison example 3, respectively. On the other hand, FIG. 14 is the one showing, by a perspective diagram, the operation of a lens module 4 in the image pickup device 2 in the embodiment, and (A) shows the state before the operation, and (B) shows the state after the operation.

COMPARISON EXAMPLE 1

In the lens module 100 according to the comparison example 1 shown in FIG. 11(A), using guide sections 101A, 101B, 102A, and 102B, a lens holding member 103 and a lens 104 are moved along the optical axis Z1 thereof (parallel to the optical axis Z1). To be specific, by a polymer actuator element 105 shaped like a flat plate, the lens holding member 103 is to be driven.

However, in this lens module 100, the torque (driving force) of the polymer actuator element 105 is not sufficiently large in value with respect to the friction with the guide sections 101A, 101B, 102A, and 102B. Therefore, in this comparison example 1, the moving operation of the lens 104 is not performed consistently. To be specific, as shown in FIG. 11(B), for example, the lens is hardly moved until the driving force takes a certain value (threshold value Tth), but at the instant when the threshold value Tth is exceeded, is abruptly moved and also thereafter, is moved unstably (nonlinearly) in response to any increase of the driving force, for example.

COMPARISON EXAMPLE 2

Figure 12:
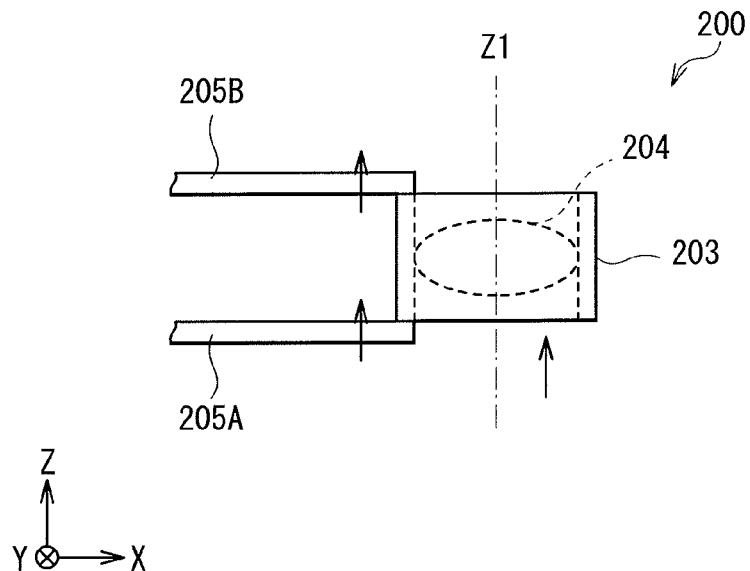
FIG. 12 A schematic diagram for explaining the configuration and operation of a lens module according to a comparison example 2.

On the other hand, in the lens module 200 in the comparison example 2 shown in FIG. 12, along the direction of the optical axis Z1 of a lens 204, a pair of flat-shaped polymer actuator elements 205A and 205B are disposed to oppose each other in the vertical direction of the lens holding member 203 (parallel plate mode).

Such a lens module 200, however, has a difficulty in moving the lens 204 along the optical axis Z1 thereof while keeping it in the parallel state. That is, the lens 204 may not operate parallel with respect the optical axis Z1 thereof.

COMPARISON EXAMPLE 3

Figure 13:
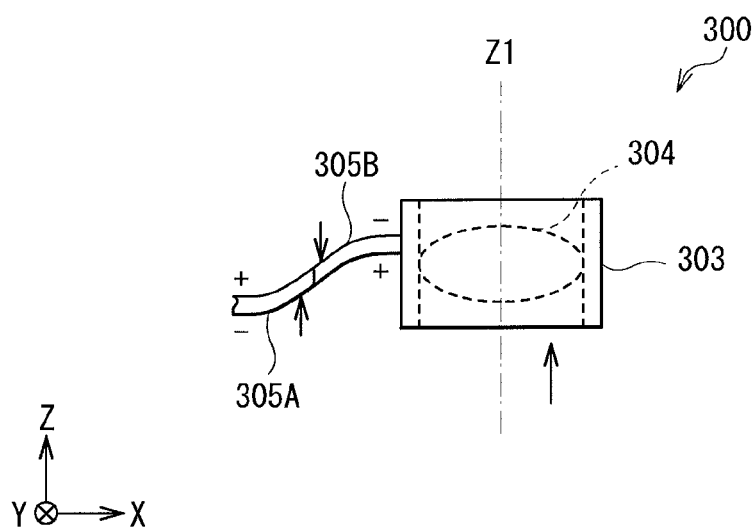
FIG. 13 A schematic diagram for explaining the configuration and operation of a lens module according to a comparison example 3.
Figure 14:
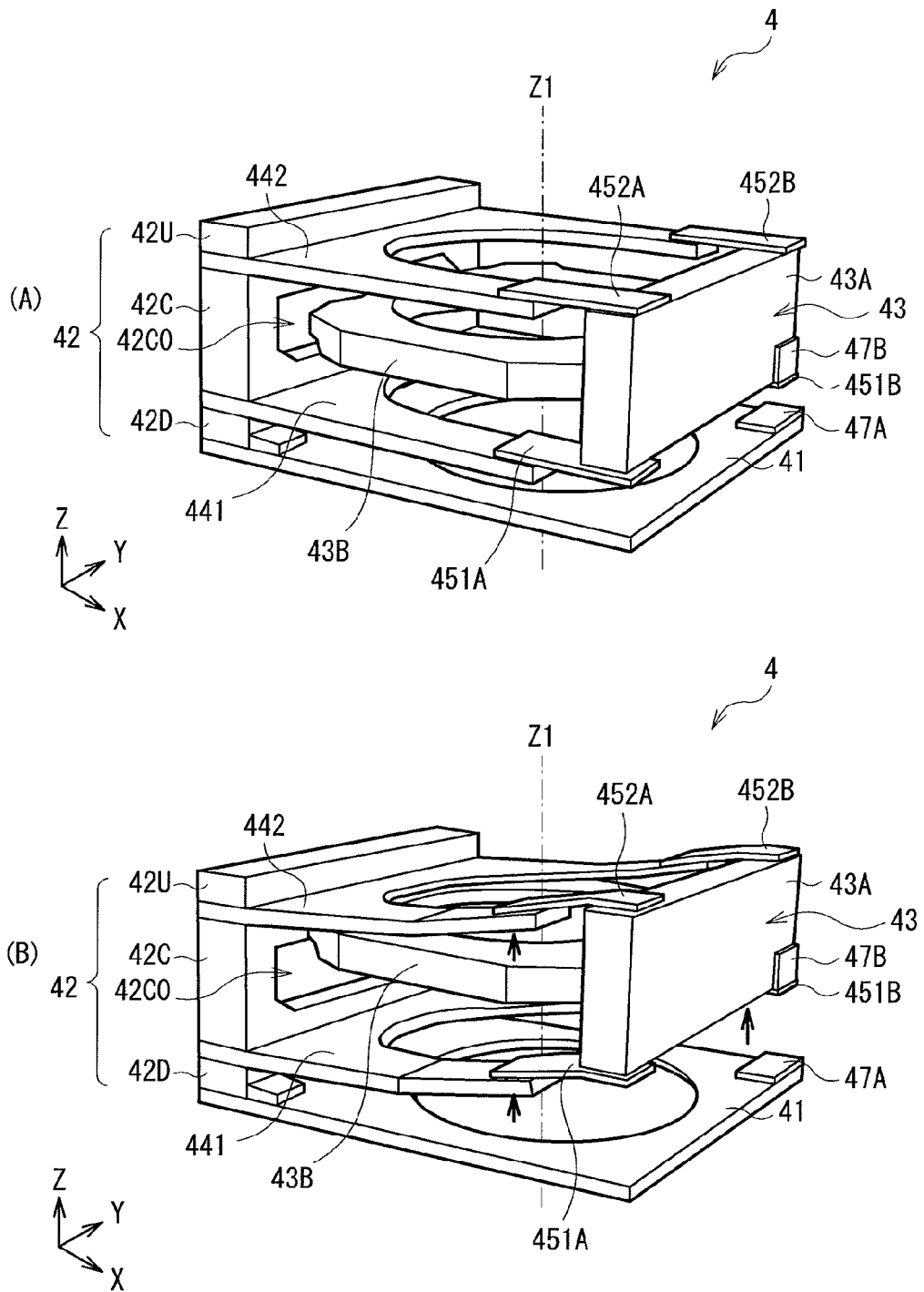
FIG. 14 Perspective views for illustrating the operation of a lens module in the embodiment shown in FIG. 3.

On the other hand, in the lens module 300 in the comparison example 3 shown in FIG. 13, as shown in the drawing, a set of polymer actuator elements 305A and 305B are combined together, which have different bending directions by varying the polarity of an applied voltage. As such, a lens holding member 303 and a lens 304 are moved in the direction of the optical axis Z1 thereof.

However, also in this lens module 300, when the inconsistency of operation (variations in amount of deformation) resulted from variations in characteristics or others is observed between such a set of polymer actuator elements 305A and 305B, this causes a difficulty in moving the lens 304 in the direction of the optical axis 11 thereof. That is, there may be cases where the lens 304 does not move parallel with respect to the optical axis Z1 thereof, or the lens 304 is tilted with respect to the optical axis Z1 thereof.

As such, in these lens modules 100 to 300 in the comparison examples 1 to 3 (the lens drive devices using the polymer actuator elements according to the comparison examples 1 to 3), moving the lens with good accuracy in the direction of the optical axis Z1 thereof is difficult.

(Embodiment)

On the other hand, in the lens module 4 in the image pickup device 2 of the embodiment, as shown in FIGS. 3 and 4, and FIG. 14(A) described above, by the lens holding member 43 being driven by a pair of polymer actuator elements 441 and 442, the lens 48 becomes able to move along the optical axis Z1 thereof. At this time, the lens holding member 43 is driven via the coupling members 451A, 451B, 452A, and 452B. As such, as shown in FIG. 14(B), for example, the holding section 43B (and the lens 48) is to be driven with more ease in the Z-axis direction while remaining in the parallel state with respect to the support member 41. That is, the lens 48 is to be moved with more ease along the optical axis Z1 thereof.

Moreover, especially in the embodiment, these coupling members 451A, 451B, 452A, and 452B have the rigidity same as or lower than that of each of the polymer actuator elements 441 and 442. Then, the polymer actuator elements 441 and 442 are each displaced in the same direction. This accordingly generates the flexibility for the coupling members 451A, 451B, 452A, and 452B to bend in the direction opposite to the bending direction of the polymer actuator elements 441 and 442. Therefore, the cross-sectional shape in the cantilever configured by the polymer actuators 441 and 442 and the coupling members 451A, 451B, 452A, and 452B is to render the S-shaped curve. As a result, the connection section 43A becomes able to move in parallel along the Z-axis direction, and the holding section 43B (and the lens 48) will be driven with more ease in the Z-axis direction while remaining in the parallel state with respect to the support member 41 (the lens 48 will be moved with much more ease along the optical axis Z1 thereof).

As described above, in the embodiment, by a pair of polymer actuator elements 441 and 442, the lens holding member 43 is driven via the coupling members 451A, 451B, 452A, and 452B so that the lens 48 can be moved with good accuracy in the direction of the optical axis Z1 thereof. As a result, focusing, zooming, and others can be performed with good accuracy, thereby being able to obtain the sufficient optical property.

MODIFIED EXAMPLES

As such, although the invention is described with the embodiment, the invention is not restricted to this embodiment, and various other modification can be devised.

For example, in the embodiment above, described is the case of providing a pair of polymer actuator elements, but a pair is not necessarily restrictive, and a plurality of three or more polymer actuator elements may be provided.

Moreover, the shape of the polymer actuator elements is not restricted to the one described in the embodiment above, and also the laminate configuration thereof is not restricted to the one described in the embodiment above, and are changeable as appropriate. Furthermore, the shape, material, and others of each of the members in the lens module (the lens drive device) are not restricted to those described in the embodiment above. For example, in some cases, the coupling members may be each made of a material having the rigidity higher than that of each of the polymer actuator elements. Moreover, in the embodiment above and others, described is the case where one end side of the actuator element is directly fixed by the fixing member 42, but this case is not restrictive. That is, an end side of the actuator element may be fixed indirectly (via a fixed electrode or others) by the fixing member 42.

The lens drive device, the lens module, and the image pickup device of the invention are applicable not only to the mobile phone described in the embodiment above but also to various other electronic devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A lens drive device, comprising:
a lens holding member holding a lens;
a plurality of polymer actuator elements each having a drive surface orthogonal to an optical axis of the lens, and being disposed in such a manner that the drive surfaces are opposed to each other along the optical axis of the lens;
a fixing member fixing directly or indirectly an end of each of the plurality of polymer actuator elements, wherein in the fixing member, a corner portion on a movable end side of the polymer actuator elements is chamfered; and a coupling member coupling the other end of each of the plurality of polymer actuator elements and an end portion of the lens holding member.

2. The lens drive device according to claim 1, wherein the lens holding member includes:

a holding section holding the lens; and a connection section supporting the holding section, and connecting the holding section and the coupling member, and the holding section is disposed between the drive surfaces of the polymer actuator elements.

3. The lens drive device according to claim 2, wherein the fixing member is formed with an aperture for partially sandwiching the holding section.

4. The lens drive device according to claim 1, wherein the polymer actuator elements each include:

a fixing section fixed to the fixing member; and a pair of protrusion sections provided to both end portions of the fixing section, and configuring the drive surface.

5. The lens drive device according to claim 4, wherein the protrusion sections each have a width gradually narrowing from the fixing section side to a tip end side.

6. The lens drive device according to any one of claims 1, wherein the coupling member has rigidity same as or lower than that of each of the polymer actuator elements.

7. The lens drive device according to claim 1, wherein the coupling member is made of a flexible film.

8. The lens drive device according to claim 1, wherein the polymer actuator elements each include:

a pair of electrode films; and a polymer compound film disposed by insertion between the pair of electrode films.

9. A lens module, comprising:

a lens;

a lens holding member holding the lens;

a plurality of polymer actuator elements each having a drive surface orthogonal to an optical axis of the lens, and being disposed in such a manner that the drive surfaces are opposed to each other along the optical axis of the lens;

a fixing member fixing directly or indirectly an end of each of the plurality of polymer actuator elements, wherein in the fixing member, a corner portion on a movable end side of the polymer actuator elements is chamfered; and a coupling member coupling the other end of each of the plurality of polymer actuator elements and an end portion of the lens holding member.

10. An image pickup device, comprising:

a lens;

a lens holding member holding the lens;

an image pickup element acquiring an image pickup signal as a result of image formation by the lens;

a plurality of polymer actuator elements each having a drive surface orthogonal to an optical axis of the lens, and being disposed in such a manner that the drive surfaces are opposed to each other along the optical axis of the lens;

a fixing member fixing directly or indirectly an end of each of the plurality of polymer actuator elements, wherein in the fixing member, a corner portion on a movable end side of the polymer actuator elements is chamfered; and a coupling member coupling the other end of each of the plurality of polymer actuator elements and an end portion of the lens holding member.

* * * * *